US012320187B2

(12) United States Patent
Baca et al.

(10) Patent No.: US 12,320,187 B2
(45) Date of Patent: Jun. 3, 2025

(54) PANEL FRAME JOINTS, SILLS, AND OTHER ELEMENTS OF FOLDING DOOR SYSTEMS WITH SHOOTBOLT SYSTEM

(71) Applicant: JELD-WEN, Inc., Charlotte, NC (US)

(72) Inventors: Isidore R. Baca, Oceanside, CA (US); Timothy L. McCleery, San Diego, CA (US); Philip R. Linquist, El Cajon, CA (US)

(73) Assignee: JELD-WEN, Inc.

( * ) Notice: Subject to any disclaimer, the term of this patent is extended or adjusted under 35 U.S.C. 154(b) by 690 days.

(21) Appl. No.: 17/448,272

(22) Filed: Sep. 21, 2021

(65) Prior Publication Data

US 2022/0090439 A1 Mar. 24, 2022

Related U.S. Application Data

(60) Provisional application No. 63/082,958, filed on Sep. 24, 2020.

(51) Int. Cl.
*E06B 3/26* (2006.01)
*E05C 1/00* (2006.01)
(Continued)

(52) U.S. Cl.
CPC ............ *E06B 3/9642* (2013.01); *E05C 1/006* (2013.01); *E05C 1/04* (2013.01); *E06B 1/70* (2013.01);
(Continued)

(58) Field of Classification Search
CPC ....... E06B 2003/262; E06B 2003/2615; E06B 2003/2625; E06B 3/2605; E06B 3/26301;
(Continued)

(56) References Cited

U.S. PATENT DOCUMENTS 5,655,348 A * 8/1997 Paradise ............... E06B 3/9642 403/231
5,875,600 A * 3/1999 Redman ................ E06B 3/9642 52/656.9
(Continued)

FOREIGN PATENT DOCUMENTS

CN 113882779 A * 1/2022
DE 20201808 U1 * 6/2003 ............... E05C 7/04
(Continued)

OTHER PUBLICATIONS

DNA Rovex Flyer 2019.—Xtreme Fiberglass, deceuninck technology.
(Continued)

*Primary Examiner* — Ryan D Kwiecinski
(74) *Attorney, Agent, or Firm* — Lorenz & Kopf LLP

(57) ABSTRACT

A fenestration unit configured to support a shootbolt locking system includes a panel including a panel frame with a stile member and a rail member that are attached by a corner joint. The stile and rail members are elongate and extend along a respective linear axis. The stile member is configured to receive and support at least part of the shootbolt locking system. The stile member includes a stile end with a first wall, and the rail member includes a rail end with a second wall. The corner joint includes a first bracket and a second bracket that are attached together. The first bracket is disposed within the stile end. The first wall is disposed between the first and second brackets. The second bracket projects away from the stile member, and the second bracket is received within the rail end and attached to the second wall.

19 Claims, 12 Drawing Sheets

(51) Int. Cl.

| | |
|---|---|
| ***E05C 1/04*** | (2006.01) |
| ***E06B 1/70*** | (2006.01) |
| ***E06B 3/48*** | (2006.01) |
| ***E06B 3/96*** | (2006.01) |
| ***E06B 3/964*** | (2006.01) |
| *E06B 3/263* | (2006.01) |

(52) U.S. Cl.
CPC ..... *E06B 3/2605* (2013.01); *E06B 2003/2615* (2013.01); *E06B 3/26303* (2013.01)

(58) Field of Classification Search
CPC ........ E06B 3/26303; E06B 3/48; E06B 3/481; E06B 3/5009; E06B 3/5054; E06B 3/964; E06B 3/9642; E04C 1/006; E04C 1/04
See application file for complete search history.

(56) References Cited

U.S. PATENT DOCUMENTS

| | | | | |
|---|---|---|---|---|
| 2011/0091269 | A1* | 4/2011 | Solly | E06B 3/9642 403/37 |
| 2013/0272777 | A1* | 10/2013 | Hayter | E06B 7/082 403/205 |
| 2015/0113904 | A1* | 4/2015 | Sprague | E06B 3/70 52/656.9 |
| 2015/0330126 | A1 | 11/2015 | Ma et al. | |
| 2019/0119964 | A1* | 4/2019 | Hau | E05B 63/20 |
| 2020/0308899 | A1* | 10/2020 | Alkarram | E06B 3/4636 |
| 2022/0098924 | A1* | 3/2022 | Liebscher | E06B 3/26305 |

FOREIGN PATENT DOCUMENTS

| | | | | | |
|---|---|---|---|---|---|
| DE | 10345624 | A1 | * | 5/2005 | E06B 3/9642 |
| FR | 2764966 | A1 | * | 12/1998 | E06B 3/9642 |
| GB | 2259933 | A | * | 3/1993 | E06B 1/70 |
| GB | 2316970 | A | * | 3/1998 | E06B 7/215 |

OTHER PUBLICATIONS

Lacantina Doors. DP70 Impact Rated System. LCD Impact Brochure. LaCANTINADOORS.COM.

Rovex—Xtreme Fiberglass, deceuninck technology. Deceuninck North America.

* cited by examiner

PANEL FRAME JOINTS, SILLS, AND OTHER ELEMENTS OF FOLDING DOOR SYSTEMS WITH SHOOTBOLT SYSTEM

CROSS REFERENCE TO RELATED APPLICATION

This application claims the benefit of U.S. Provisional Patent Application No. 63/082,958, filed Sep. 24, 2020, the entire disclosure of which is incorporated by reference.

TECHNICAL FIELD

This disclosure relates to fenestration systems and fenestration units, such as folding door systems. These systems may be used for residential and commercial buildings. The disclosure further relates to door panel and frame members utilizing extruded rail elements, joinery hardware for such panel and frame members, and more. Various features are disclosed reinforced thermally-broken construction of metal panel frames for door systems, sill assemblies for door systems including configurable sill upstand arrangements, and other hardware and elements of fenestration systems, such as folding door systems. Furthermore, this disclosure includes methods of manufacturing these fenestration systems, methods of manufacturing the hardware and elements, etc. Moreover, this disclosure includes methods of assembling these fenestration units by utilizing the joinery hardware disclosed herein.

BACKGROUND

Multi-panel door systems often include large glass panels. These are commonly framed with aluminum frame assemblies and are typically several feet wide. They may be eight (8) to twelve (12) feet tall or larger. They may be arranged in a wall configuration when closed. In a folding multi-panel patio door system, some or all of the panels are joined by hinges along their lateral margins at adjacent stiles of the panels, and may include hangers that ride in a header track of a door frame system to allow the door panels to be pivoted and slidably moved to a lateral margin of the opening of the building or other space in which the door system is installed.

It is desirable for panels of folding door systems to have frames that are as narrow as possible to avoid inhibiting the sight lines through the glass panels. Narrow frames are also desirable for other types of glass door systems, such as sliding patio doors. However, because each panel may include a double- or triple-pane insulated glass assembly (IGU) weighing several hundred pounds, the panel frame assemblies must be strong and rigid enough to carry the weight reliably, allow smooth movement, and to provide security when closed. Achieving narrow frame configurations capable of supporting such loads while also providing good thermal performance has been a longstanding challenge. Frame members also typically need to accommodate hinges, carriages, latches, and other operating hardware, which is a further constraint on the design of narrow frames for improved sight lines.

In an effort to address these needs, the present inventors have developed improved panel frame assemblies and hardware for joining the corners of such panel frames. These features may facilitate manufacture while also providing robust connection and joinery solutions. Furthermore, a latching system may be incorporated within the frame in a compact and low-profile manner as disclosed herein.

Moreover, the inventors have also developed an improved, reinforced thermal break arrangement for use in panel frames and doorframes for patio doors and other types of door systems. The present inventors have also developed improved sill assemblies for a door system, such as a patio door, with a configurable upstand portion. Narrow-frame panels according to the present disclosure are also designed to accommodate operator hardware and a locking/latching system in a compact, low-profile configuration that is aesthetically pleasing, that avoids inhibiting sight lines, and that improves ergonomic performance. These and other aspects and advantages of the present disclosure will be apparent from the following detailed description of preferred embodiments, which proceeds with reference to the accompanying drawings.

SUMMARY

A fenestration unit configured to support a shootbolt locking system is disclosed. The fenestration unit includes a panel including a panel frame with a stile member and a rail member that are attached by a corner joint. The stile member and the rail member are elongate and extend along a respective linear axis. The stile member is configured to receive and support at least part of the shootbolt locking system. The stile member includes a stile end with a first wall, and the rail member includes a rail end with a second wall. The corner joint includes a first bracket and a second bracket. The first bracket and the second bracket are attached together. The first bracket is disposed within the stile end. The first wall is disposed between the first and second brackets. The second bracket projects away from the stile member, and the second bracket is received within the rail end and attached to the second wall.

A method of manufacturing a panel of a fenestration unit configured to support a shootbolt locking system is also disclosed. The method includes providing a stile member and a rail member of a panel frame of the panel. The stile member and the rail member are elongate and extend along a respective linear axis. The stile member is configured to receive and support at least part of the shootbolt locking system. The stile member includes a stile end with a first wall, and the rail member includes a rail end with a second wall. The method also includes attaching the stile member and the rail member with a corner joint, including: attaching a first bracket and a second bracket together with the first bracket disposed within the stile end, the first wall disposed between the first and second brackets, and the second bracket projecting away from the stile member; inserting the second bracket into the rail end; and attaching the second wall to the second bracket.

Moreover, a folding door system is disclosed that includes a panel. The panel includes a panel frame with a stile member and a rail member that are attached by a corner joint. The stile member and the rail member are elongate and extend along a respective linear axis. The folding door system also includes a shootbolt locking system with a shootbolt cartridge supported in the stile member and an operator control supported in the stile member. The stile member includes a stile end with a first wall, and the rail member includes a rail end with a second wall. The corner joint includes a first bracket and a second bracket. The first bracket and the second bracket are attached together. The first bracket is disposed within the stile end proximate the shootbolt cartridge. The first wall is disposed between the first and second brackets. The second bracket projects away from the stile member, and the second bracket is received within the rail end and attached to the second wall.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a fenestration unit, such as a folding door assembly that provides low-profile frames with locking/latching systems, such as a shootbolt system. Furthermore, embodiments of the present disclosure include corner joints for joining members of the frames together in a robust and highly manufacturable manner. These corner joints may also include features configured specifically for incorporating the locking latching system of the fenestration unit into the frame in a compact manner. User controls, such as handles, levers, etc. may be incorporated in a compact, low-profile manner as well. Various methods of manufacturing these features are also disclosed according to example embodiments of the present disclosure.

Figure 1:
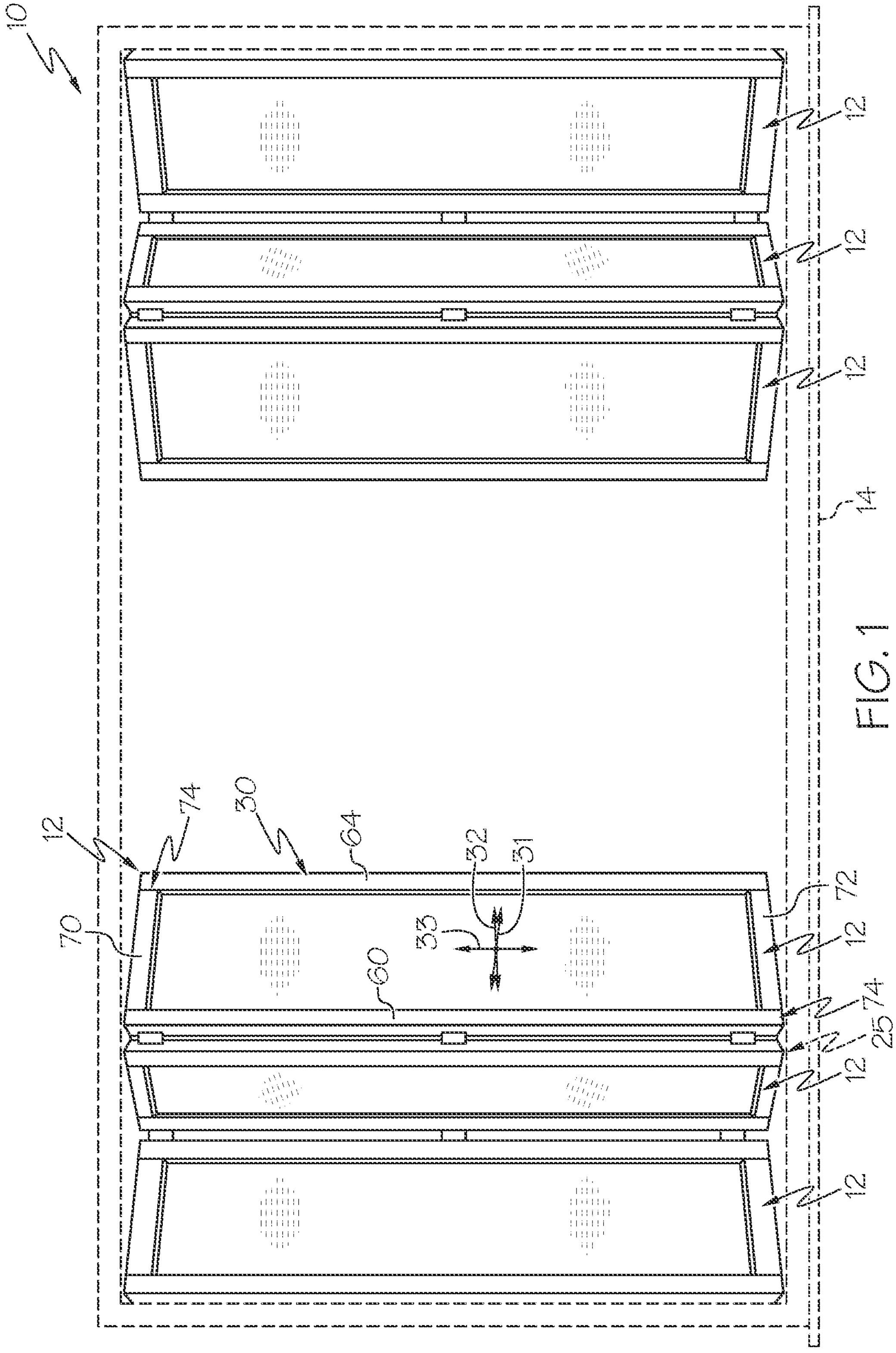
FIG. 1 is an elevation view of a folding door system, such as a folding patio door system with panels shown in a partially-open configuration.

FIG. 1 shows a fenestration unit, such as a folding door system 10, which may be configured according to example embodiments of the present disclosure. It will be appreciated that one or more features may be incorporated in another fenestration unit, such as a folding window system, without departing from the scope of the present disclosure.

Generally, the folding door system 10 may include a door frame 14, which is rectangular, and which supports the plurality of panels 12 for movement therein. It will be appreciated that FIG. 1 illustrates one possible arrangement for such a folding door system 10. The door system 10 may include two sets of three connected door panels 12 that meet in the middle of the door system 10. Each set of three panels 12 is illustrated in FIG. 1 in a partially-open position. The panels 12 are supported in and guided by a track of a door frame 14 so that each set of panels can be opened to one side of the opening by folding the set, as an accordion, thereby providing a very large passageway from an interior space of a building to another interior or exterior space, such as a patio. A latching system, indicated generally at 25, may be included as will be discussed. In the closed position, the latching system 25 may be operated to secure the panels 12 to the door frame 14.

Each door panel 12 may include a respective panel frame assembly 30, which supports a respective glazing panel 124. As shown for reference, the panel frame assembly 30 may define an interior/exterior direction 31, a lateral direction 32, and a vertical direction 33.

The panel frame assembly 30 of at least one panel 12 may include opposing stiles, i.e., a first stile 60 and a second stile 64, which extend along the vertical direction 33 and that are separated along the lateral direction 32 of the panel 12. The panel frame assembly 30 of the panel 12 may further include opposing rail members, i.e., an upper rail 70 and a lower rail 72, which extend in the lateral direction and that are connected to the stiles 60, 64 at respective corner joints 74, which may be configured according to one or more embodiments discussed below.

As will be discussed, the stiles 60, 64 may include and/or may be assembled from a plurality of members (i.e., from a plurality of stile members). Likewise, the rails 70, 72 may include and/or may be assembled from a plurality of members (i.e., from a plurality of rail members). These members may be configured, for example, according to the embodiments shown in FIGS. 2-3.

Figure 2:
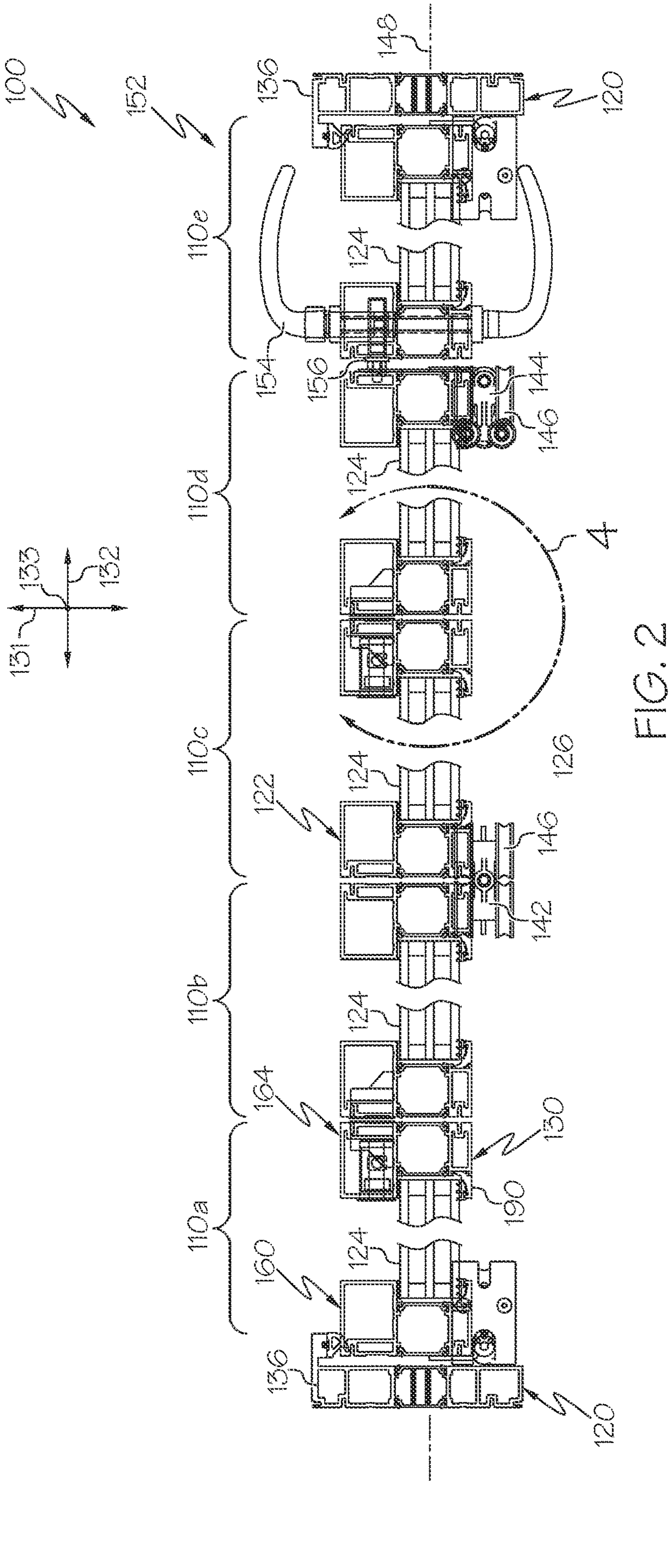
FIG. 2 is a horizontal section view of a folding door system, such as a folding patio door system including five panels illustrated in a closed position.

FIG. 2 is a horizontal section view of a folding patio door system 100 according to additional embodiments of the present disclosure. The folding patio door system 100 may include five panels 110 (labeled 110*a* to 110*e* and referred to herein as first, second, third, fourth, and fifth panels, respectively) mounted within a door frame 120. In the embodiment of FIG. 2, glazing panels 124 are illustrated in the form of triple-pane insulated glazing units (IGUs) and their width is broken for purposes of compact illustration. Those having ordinary skill in the art will appreciate that glazing panels 124 may take many forms, including single pane, double-pane IGUs, etc., and may be formed of glass or another transparent material. In FIG. 2, the panels 110 are illustrated in a closed position relative to the frame 120, separating an interior space of a building or room, from the exterior of the building or room. In other words, the panels 110 and frame 120 may include an interior side 122 and an exterior side 126.

For reference purposes, the interior/exterior direction is indicated at 131, the lateral direction is indicated at 132, and the vertical direction is indicated at 133. Moreover, a plane 148 of the frame 120 is indicated. When the panel 110 is in the closed position, the interior/exterior direction 131 of the panel 110 may be normal to the plane 148 of the frame 120. However, as the panel 110 moves open, the interior/exterior direction 131 pivots relative to the plane 148 of the frame 120.

Figure 5:
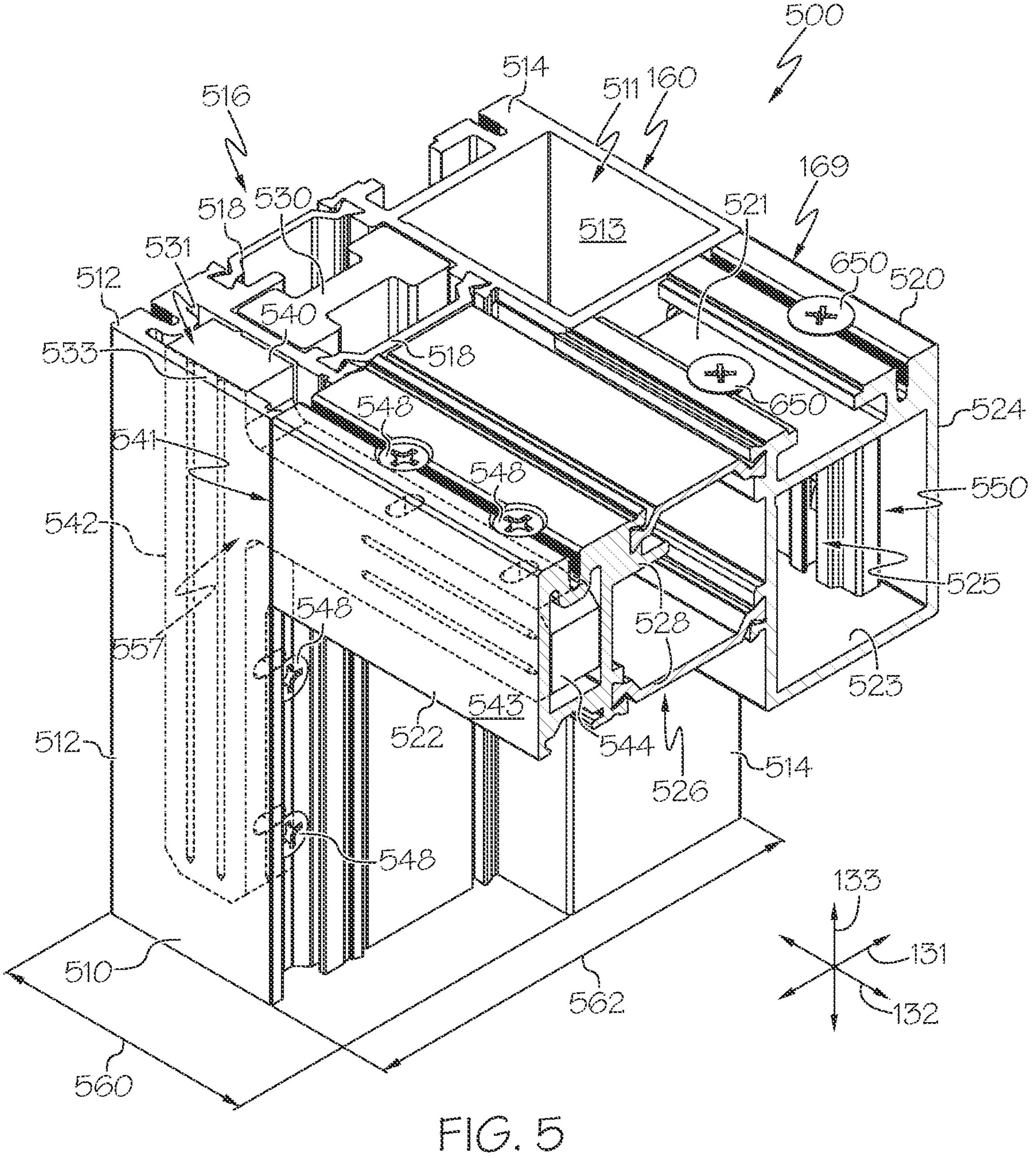
FIG. 5 is an enlarged top isometric sectional view of a corner joint of a panel of the folding patio door system of FIG. 2, with a glazing unit and glazing stop of the panel omitted.
Figure 12:
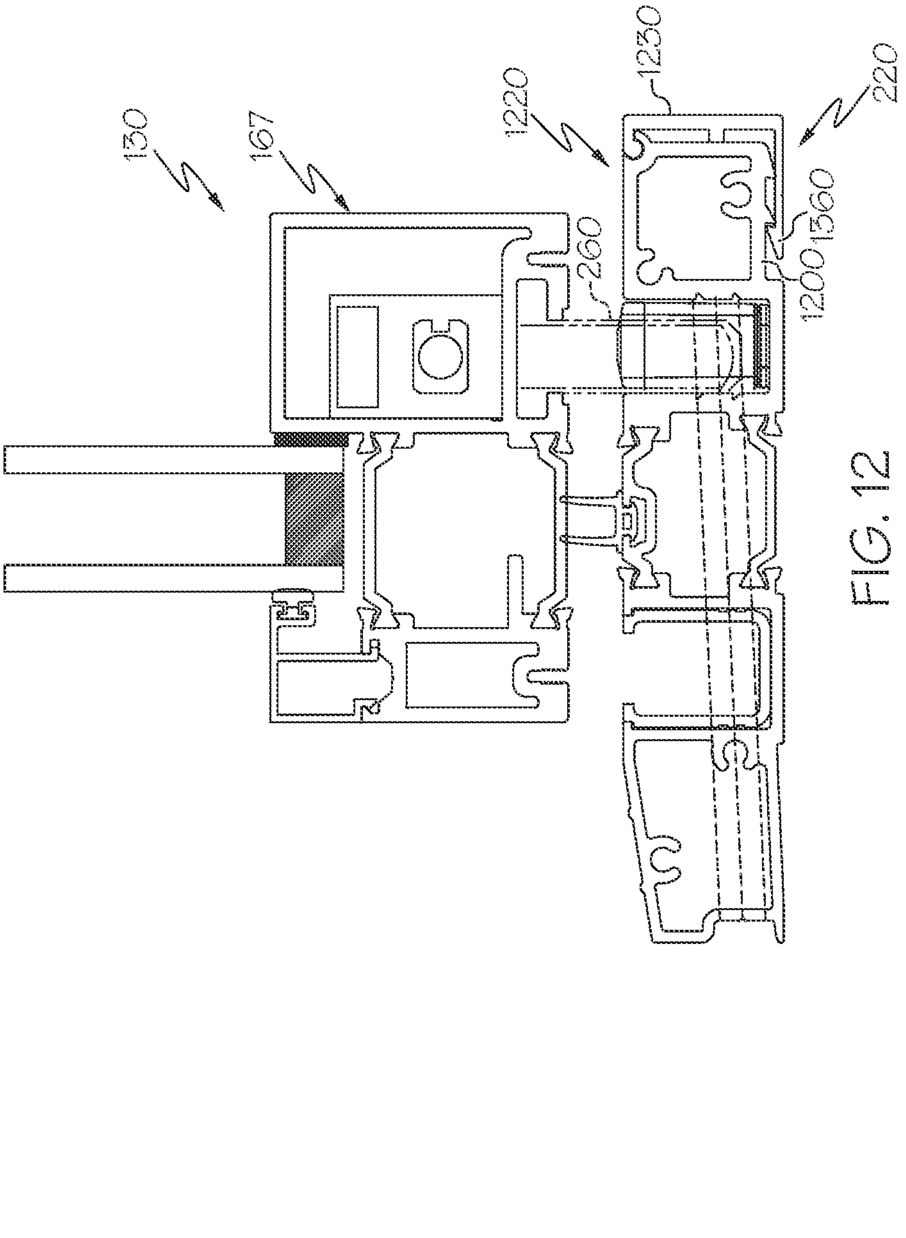
FIGS. 12, 13, and 14 are vertical sectional side views of a sill assembly of the folding patio door system of FIG. 2 in three different optional configurations, namely respective flush, standard, and extended upstand configurations.

Each panel 110 includes a panel frame assembly 130 that frames and supports the corresponding glazing panel 124. Like the embodiments of FIG. 1, at least one panel frame assembly 130 may include a first stile 160 and a second stile 164 (i.e., first and second stile members). As shown in FIG. 5, the first stile 160 may be joined to an upper rail 169 via a corner joint assembly 500. The second stile 164 may be joined to the upper rail 169 by a similar corner joint assembly 500. Likewise, as shown in FIG. 12, the panel frame assembly 130 may include a lower rail 167. The first and second stiles 160, 164 may be joined to the lower rail 167 via another corner joint assembly 500.

The first stile 160 and the second stile 164 may include members that are common to both. Likewise, the upper rail 169 may share components that are common to the lower rail 167. Furthermore, the panel frame assembly 130 may include a plurality of the corner joint assemblies 500 disclosed herein. In various embodiments, each panel 110 may be sized in the range of about 20 to 48 inches (508 to 1219 mm) wide, or wider, and about 30 to 144 inches (762 to 3658 mm) tall, or taller, and may typically weigh in the range of about 25 to 300 pounds (11 to 136 kg) or more.

Door frame 120 includes jambs 136 that extend vertically upward along the vertical direction 133 from a sill 220 (FIGS. 12-14) to a header rail assembly 1510 (FIG. 15) of the door frame 120. The sill 220 and header rail assembly 1510 extend horizontally along the lateral direction 132 between the pair of jambs 136. The sill 220 and the header rail assembly 1510 may be separated at a distance along the vertical direction 133.

Figure 3:
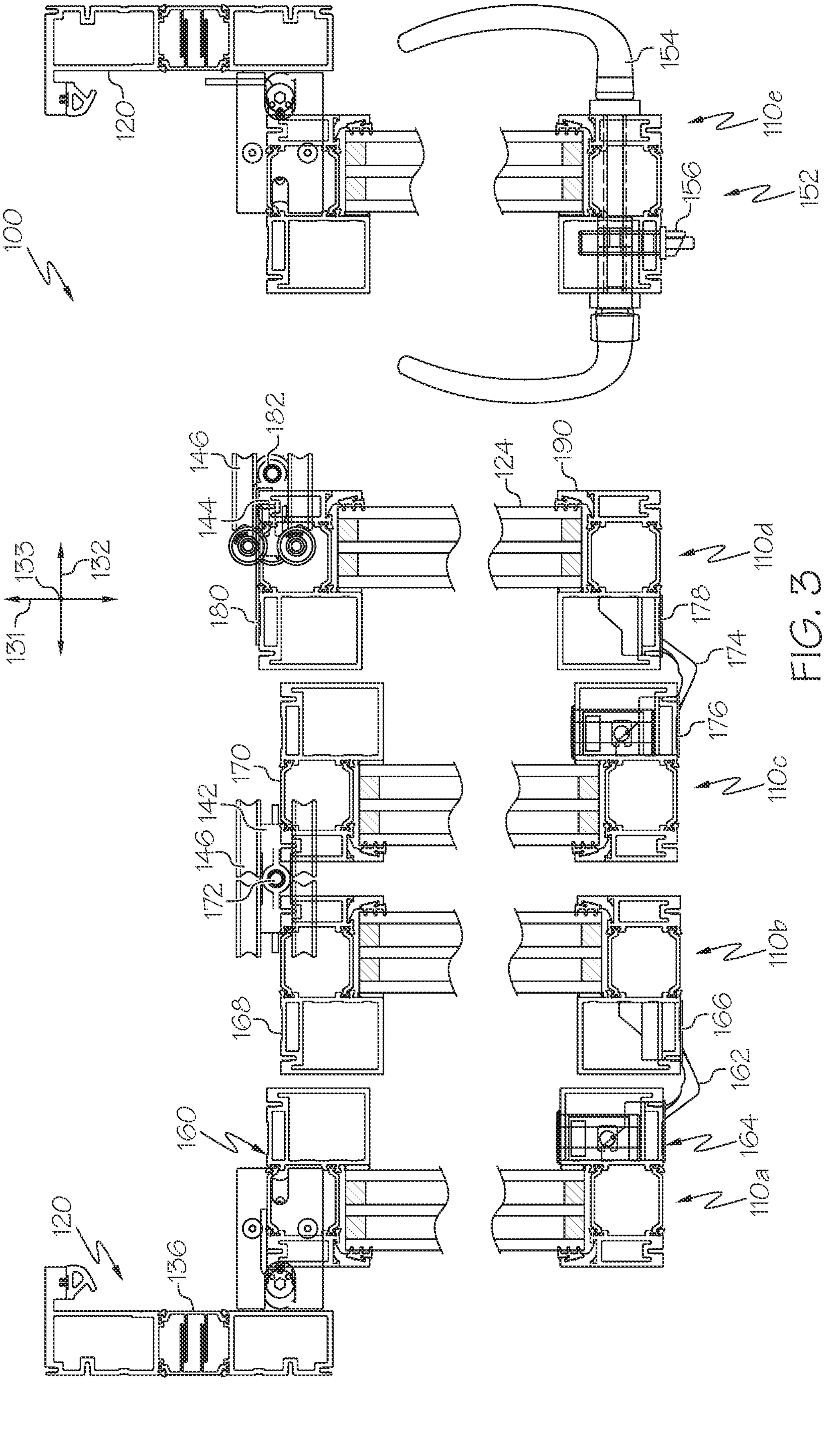
FIG. 3 is a horizontal section view of the folding patio door system of FIG. 2 illustrated in an open position.
Figure 15:
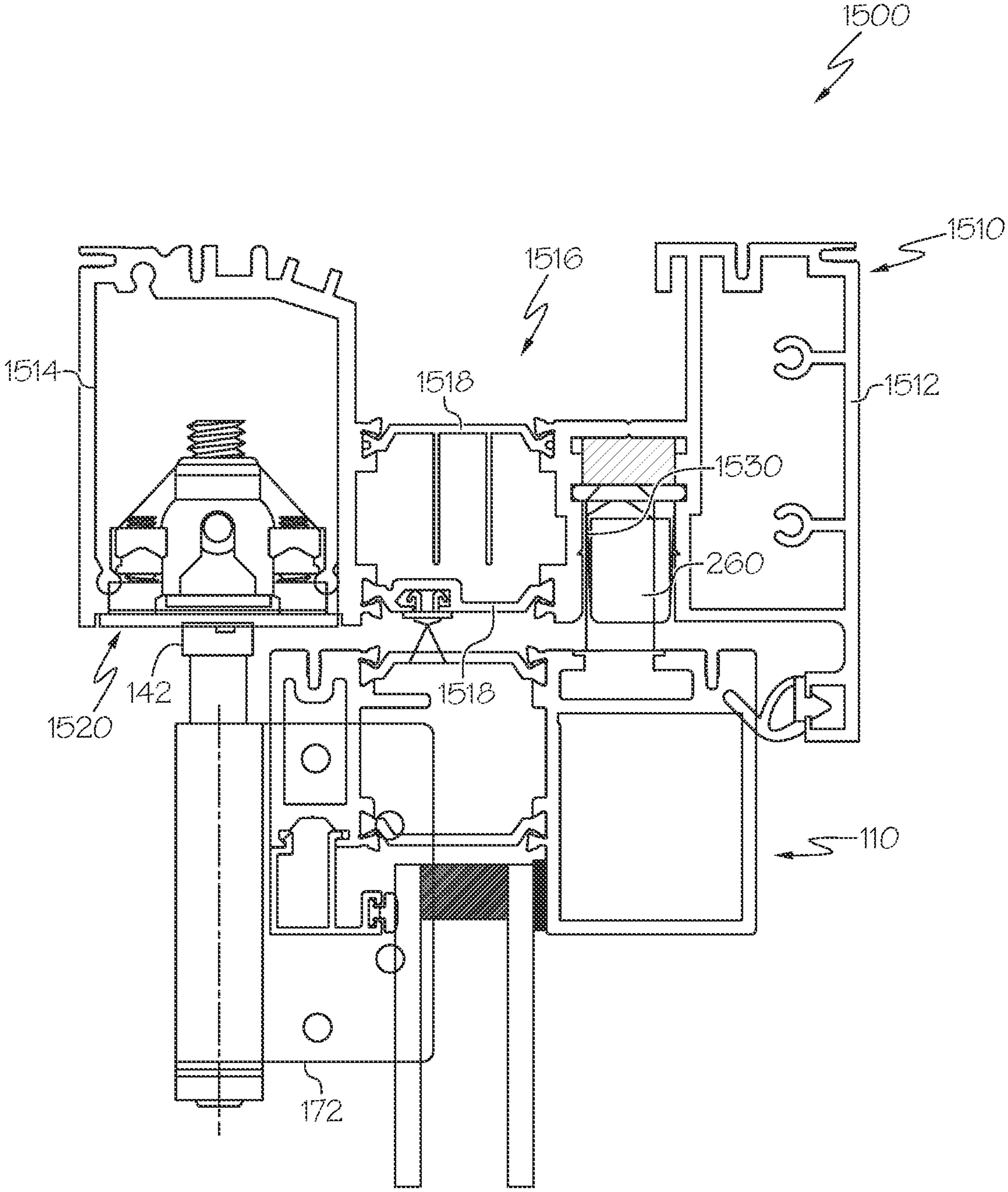
FIG. 15 is a vertical sectional side view of a header assembly of the folding patio door system of FIG. 2.

The panels 110 may be hung from the door frame 120. In some embodiments, some of the panels (e.g., panels 110*b* to 110*d*) may be suspended from the header rail assembly 1510 of the door frame 120 (FIG. 15). As shown in FIG. 2, the panel 110 may be suspended by first and second hangers 142, 144 that include rollers 146. The rollers 146 may be guided by and movable along a track (FIG. 15) in the header rail assembly 1510 that extends in the lateral direction 132 or parallel to the plane 148 of the door frame 120. Further guide hardware may be attached along a lower margin of some or all of the panels 110 to guide the panels along a track in the sill that is in or parallel to plane 148 and to the track in the header rail. As shown in the embodiment illustrated in FIG. 2, one of the panels (e.g., the fifth panel 110*e*) may be an independently movable swing door 152 that is hinged to jamb 136. Swing door 152 may be opened with an operator handle 154 that operates a latch 156 that latches swing door 152 to panel 110*d*. Swing door 152 serves as a primary door for ingress/egress when folding patio door system 100 is in the closed position. In the embodiment of FIG. 2, the other panels 110*a* to 110*d* may be foldable open as a set when desired, as is illustrated in FIG. 3. Those having ordinary skill in the art will appreciate many other configurations of a folding multi-panel door system are possible, including two, three, four or more groupings of folding panels, multiple latching panels, and fewer or more swing door panels. In some embodiments, two sets of folding panels may move along intersecting frame sections oriented transversely, and when closed, the sets of panels may meet at the intersection (at a corner of the building). Many of the features described herein may be realized with as few as two panels. And some of the features may be realized with a single panel. Moreover, some features may be employed in fenestration systems other than folding patio door systems, such as sliding doors and windows, for example.

FIG. 3 illustrates the folding patio door system 100 in an open position, with panels 110*a* to 110*d* folded to one side of door frame 120 in accordion manner, and swing door 152 (panel 110*e*) opened as well. First panel 110*a* is hinged to jamb 136 along the first stile 160 of first panel 110*a*, so that first panel 110*a* swings outwardly.

The panels 110 may be attached, for example, for folding movement relative to each other. The panels 110 may be attached using a number of different attachment features without departing from the scope of the present disclosure. For example, a first set of two or more concealed offset hinges 162 connects the second stile 164 of first panel 110*a* to a first stile 166 of second panel 110*b* so that the concealed hinges 162 move outwardly from frame 120 when panels 110*a*, 110*b* are folded open. A second stile 168 of second panel 110*b* is connected to a first stile 170 of third panel 110*c* by hinges including a hinge 172 suspended from hanger 142. A second set of two or more concealed offset hinges 174 connects a second stile 176 of third panel 110*c* to a first stile 178 of fourth panel 110*d*. Finally, a second stile 180 of fourth panel 110*d* is mounted on a hinge system including a single hinge 182 suspended from second hanger 144. The folding patio door system 100 of FIGS. 2-3 is set up in an outswing configuration, but in other embodiments an inswing configuration may be possible by reversing the hinges 162, 172, 174, 182 or by providing different hardware.

Figure 4:
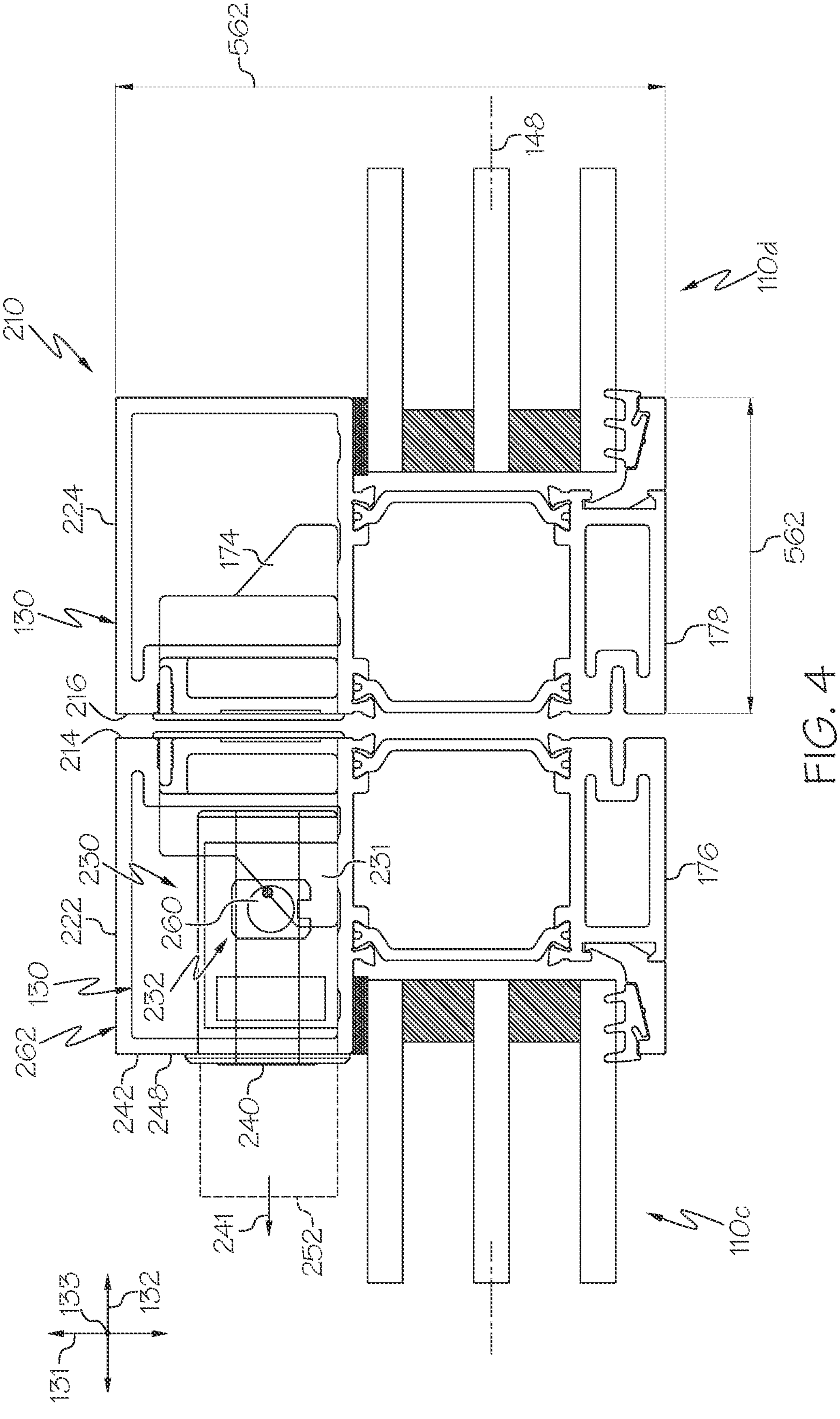
FIG. 4 is an enlarged detail horizontal section view of adjoining two adjacent panels of the folding patio door system of FIG. 2, taken at 4-4 of FIG. 2, showing hardware elements of a concealed hinge and a recessed release lever for a shootbolt system or a lock bolt mechanism of the door system.

FIG. 4 is an enlarged horizontal sectional detail view illustrating the panel frame assembly 130 of the third panel 110*c* and the fourth panel 110*d*. As shown, the panel frame assembly 130 of the third panel 110*c* may include stile 176, and the panel frame assembly 130 of the fourth panel 110*d* may include stile 178. In some embodiments, the stile 176 may include an interior stile extrusion 222, which is disposed on the interior side of the panel 110*c*. The interior stile extrusion 222 may be hollow and may be linear and substantially straight along the vertical direction 133. The stile 178 may include an interior stile extrusion 224, which may be substantially similar and a mirror-image of the interior stile extrusion 222. The interior stile extrusions 222, 224 may be formed of metal, such as aluminum and may be formed via a known extrusion process.

FIG. 4 also illustrates a hinged joint 210 between third panel 110*c* and fourth panel 110*d*, shown in the closed position. The arrangement of joint between first and second panels 110*a* and 110*b* (FIG. 2) (and any other joints with concealed hinges, in larger systems) may be identical to the arrangement of joint 210.

With reference to FIG. 4, concealed hinge 174 of joint 210 may be mounted to and recessed into opposing edge faces 214, 216 of respective interior stile extrusions 222, 224 of stiles 176 and 178, respectively. Opposing edge faces 214, 216 are oriented perpendicular to the plane 148 of panels 110*c*, 110*d*, and of folding patio door system 100.

At least one of the stile extrusions (e.g., the interior stile extrusion 222) may carry locking hardware, such as a shootbolt system 230. The shootbolt system 230 may include a shootbolt mechanism 232. The shootbolt mechanism 232 may include a cartridge 231 that is fixed and supported in an open end of the stile extrusion 222. The shootbolt mechanism 232 may also include a cylindrical and rigid shootbolt 260. The shootbolt 260 may be supported for movement between a retracted position and an extended position. In the retracted position, the shootbolt 260 may be disposed within the cartridge 231 and within the end of the stile extrusion 222. In the projected position, the shootbolt 260 may project out of the cartridge 231 and out of the end of the stile extrusion 222. The shootbolt 260 may move to the projected position when the panel is in the closed position to be received in the door frame 120 for detachably fixing the hinged joint 210 to sill 220 (FIGS. 12-14) and/or the header rail of frame 120. This may prevent the joint 210 from being displaced along frame 120, and may thereby secure the folding panels (110*a*-110*d*) to the door frame 120 in the closed position. The shootbolt 260 may be selectively moved to the retracted position to allow the panels 110 to open and re-close relative to the door frame 120.

As shown in FIG. 4, the panel 110 may also support an operator control for selectively actuating shootbolt(s) 260 between the retracted (unlatched) and projected (latched) positions. The operator control may include a release lever 240 in some embodiments that can be manipulated to selectively retract the shootbolt(s) 260, but the shootbolt system 230 may include other embodiments. The release lever 240 of the shootbolt system 230 may be mounted to interior stile extrusion 222. The release lever 240 may be recessed into a side 242 of interior stile extrusion 222 that is opposite the edge face 214 of interior stile extrusion 222, so that release lever 240 is normally flush with or recessed slightly into an inner side face 248 of side 242 of interior stile extrusion 222. The inner side face 248 may be perpendicular to plane 148 and may face in the lateral direction 132 toward a center of the glazing panel 124 (of third panel 110*c* or another panel). Release lever 240 may be a flip-pull style lever that is operated by pulling an end 252 of release lever 240 outwardly from the recess within interior stile extrusion 222, as indicated by the arrow 241 in FIG. 4 and as illustrated in phantom lines in FIG. 4. The release lever 240 may be optionally turned or otherwise subsequently manipulated, to thereby retract and/or release the shootbolt 260. Alternatively, the release lever 240 may be operated by pushing a second end of release lever 240 (opposite the end 252) inwardly into the recess within interior stile extrusion 222, in a direction opposite the arrow 241 in FIG. 4, which causes the end 252 of release lever 240 to flip outwardly (as illustrated in phantom lines in FIG. 4), where the end 252 can then be pulled further outwardly, turned, or otherwise manipulated to retract and/or release the shootbolt 260.

It will be appreciated that the shootbolt system 230 may include a plurality of shootbolt mechanisms 232 in a single panel 110 and that the release lever 240 may be operatively coupled to each. For example, the stile extrusion 222 may include an upper shootbolt mechanism 232 at the upper terminal end of the extrusion 222 and a lower shootbolt mechanism 232 at the lower terminal end of the extrusion 222. Manipulating the release lever 240 may simultaneously actuate the upper and lower shootbolt mechanisms 232. It will also be appreciated that other shootbolts, catches, or other locking devices may be incorporated without departing from the scope of the present disclosure.

Release lever 240 may be mechanically coupled via one or more cables or thin rods to the one or more shootbolts 260 (FIG. 12) or other locking bolts carried at one or both ends of the interior stile extrusion 222. Actuating the release lever 240 may cause the shootbolts 260 to retract from the sill 220 and/or the header rail. In some embodiments, the release lever 240 may be coupled via a cable system to magnetic actuators (e.g., magnetic shootbolt mechanisms 232) located in interior stile extrusion 222 near the top and bottom ends thereof. Furthermore, in some embodiments, the shootbolt system 230 may be magnetically and automatically actuated such that the shootbolts 260 move to the projected position and lock to the door frame 120 when the panel 110 is moved to the closed position. The release lever 240 may be manipulated to selectively retract the shootbolts 260 and allow the panel 110 to open. Such a cable connection requires very little free cross-sectional area within interior stile extrusion 222 to thread past concealed hinges 174, thereby allowing narrow stiles for improved aesthetics and better sight lines. Recessing the release lever 240 into inner side face 248 of stile extrusion 222, or to another part of stiles 176 or 178 that does not face in the direction toward the interior of the building or room (i.e. a surface that is perpendicular to, or undercut relative to, the interior face 262 of interior stile extrusion 222 and to plane 148) provides a clean look that does not distract from or occlude sight lines through the folding patio door system 100.

Referring now to FIG. 5, example embodiments of a corner joint assembly 500 of the panel frame assembly 130 is illustrated according to example embodiments. As will be discussed the corner joint assembly 500 may provide robust support at the respective corner of the panel frame assembly 130. The corner joint assembly 500 may include features for accommodating the shootbolt system 230, for facilitating manufacturing, and more.

FIG. 5 is a partially sectioned view of one of the panels 110 illustrating the corner joint or corner joint assembly 500 according to example embodiments. The glazing panel 124 and glazing stops are omitted for purposes of clarity. The same or similar corner joint arrangement, or elements thereof, may also be utilized at the other three corners of the panel 110 and in corner joints of other frame systems, such as door frames, window frames, and sash frames, including for sliding and/or hinged panels or sashes.

As shown and as mentioned above, the panel frame assembly may comprise a pair of spaced-apart vertical stiles 510 which are connected by a pair of spaced-apart horizontal rails 520 (only one stile and rail are illustrated in FIG. 5), and may frame an opening, or a transparent glazing panel, or an opaque panel. With reference to FIG. 5, corner joint assembly 500 is formed between stile 510 and rail 520, which meet to form a right-angle therebetween.

Each of the stile 510 and the rail 520 may be built up from multiple components to provide improved thermal performance. For example, stile 510 may comprise an exterior stile extrusion 512 (i.e., an exterior stile member) and an interior stile extrusion 514 (i.e., an interior stile member) which are spaced apart and connected by a thermal break 516. The exterior and interior stile extrusions 512, 514 may each be a hollow aluminum extrusion, and the thermal break 516 may comprise a pair of thermal struts 518 and an optional internal structural reinforcement 530, which are described below in further detail with reference to FIGS. 10 and 11.

Similarly, rail 520 may be built up from an exterior rail extrusion 522 and an interior rail extrusion 524 which are spaced apart and connected by a thermal break 526 formed of thermal struts 528 and an optional internal structural reinforcement. Exterior stile and rail extrusions 512, 522 may be identical in cross-sectional profile and made of extruded aluminum or another material formed using a common extrusion die, and may be cut from a single length of extruded material. Similarly, interior stile and rail extrusions 514, 524 may be identical in cross-sectional profile and made of extruded aluminum or another material formed using a common extrusion die (which may be different from or the same as the die used for the exterior stile and rail extrusions), and may be cut from a single length of extruded material.

The exterior stile extrusion 512 may include a terminal end (i.e., an exterior stile end 531) having a hollow rectangular interior defined by side walls 533. Likewise, the exterior rail extrusion 522 may include a terminal end (i.e., an exterior rail end 541) having a hollow rectangular interior defined by side walls 543. The rail end 541 may be abutted against the outer surface of the side wall 533 of the stile end 531 such that the opening at the rail end 541 is covered by the stile end 531. The rail end 541 may be fixed to the stile end 531 at a first member 557 of the corner joint assembly 500 as will be discussed.

The interior stile extrusion 514 may include a terminal end (i.e., an interior stile end 511) having a hollow rectangular interior defined by side walls 513. Likewise, the interior rail extrusion 524 may include a terminal end (i.e., an interior rail end 521) having a hollow rectangular interior defined by side walls 523. The rail end 521 may be abutted against the outer surface of the side wall 513 of the stile end 511 such that the opening at the rail end 521 is covered by the stile end 511. The rail end 521 may be fixed to the stile end 511 at a second member 525 of the corner joint assembly 500 as will be discussed.

The first member 557 of the corner joint assembly 500 may include a corner key 540 including a first leg 542 that is inserted into the end 531 of the exterior stile extrusion 512. A second leg 544 of the corner key 540 may be integrally formed of one-piece, monolithic construction with first leg 542 and may be inserted into the end 541 of exterior rail extrusion 522. First and second legs 542, 544 may be fastened to the respective exterior stile and rail extrusions 512, 522 by screws 548 that are screwed into legs 542, 544 through holes drilled through the side walls 533, 543 of the respective extrusions 512, 522. Corner key 540 may be molded from a high strength polymer material, such as fiberglass reinforced polyurethane composite, or formed from metal, or from a combination of metal and polymer materials, or another material. The lineal members of this portion of the corner joint assembly 500 may either be mitered, or one of the lineal members (in this case the exterior stile extrusion 512) may be notched to accommodate the corner key 540.

The second member 525 of the corner joint assembly 500 may include a bracket assembly 551 referred to herein as a spigot and nut plate assembly 550. The assembly 550 is shown according to example embodiments in detail in FIGS. 6-10. The assembly 551 may include a first bracket, such as a nut plate 620, and a second bracket, such as a spigot component 610.

As shown in FIGS. 5, 6, 8, and 10, the interior stile and rail extrusions 514, 524 may be joined together at their ends 511, 521 by the spigot and nut plate assembly 550. This assembly 550 eliminates the need for mitering or for notching one of the lineal members and occupies only a small fraction of the space within the hollow region inside of the interior stile extrusion 514, allowing room for other components, such as components of shootbolt system 230. The spigot and nut plate assembly 550 is illustrated in further detail with reference to FIG. 6-10.

Figure 6:
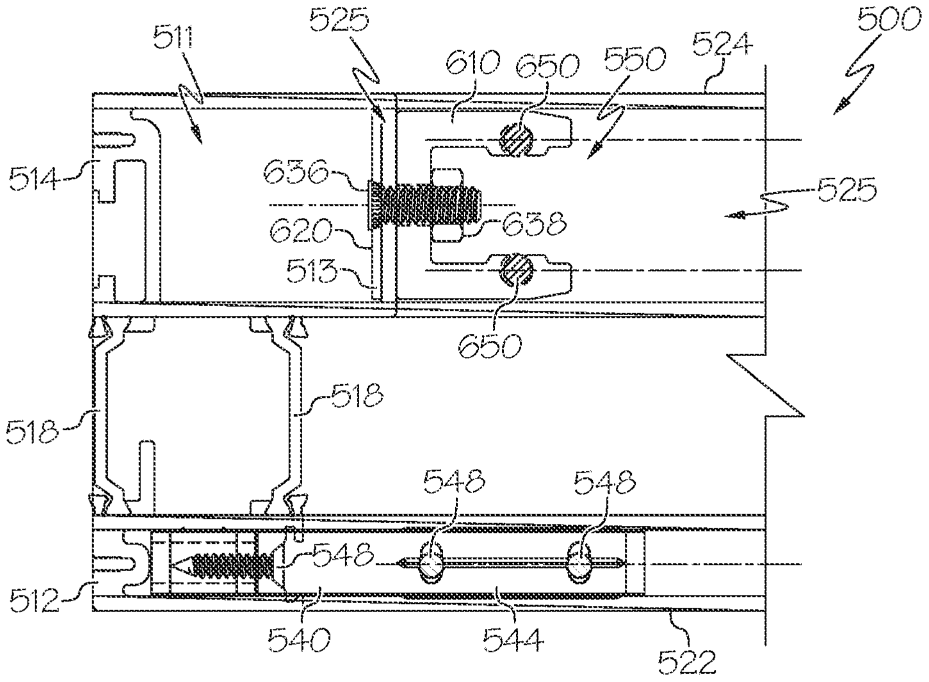
FIGS. 6, 7, and 8 are respective top, front, and right-side orthographic views of a corner joint assembly of a panel frame of the folding patio door system of FIG. 2, showing detail of a spigot and nut plate assembly, and a corner key of the corner joint.
Figure 7:
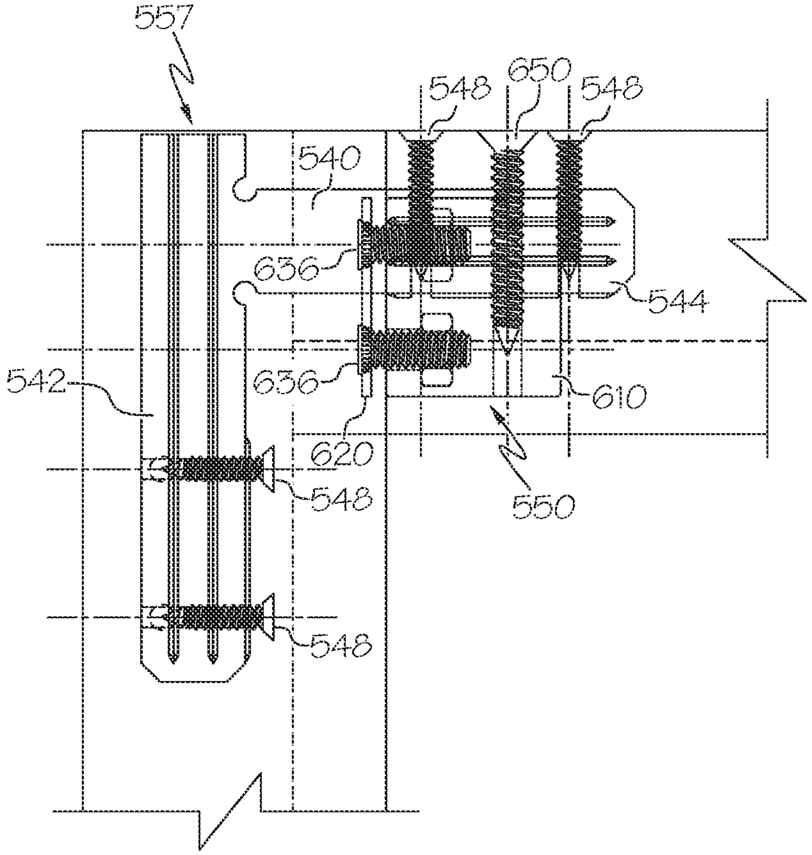
Figure 8:
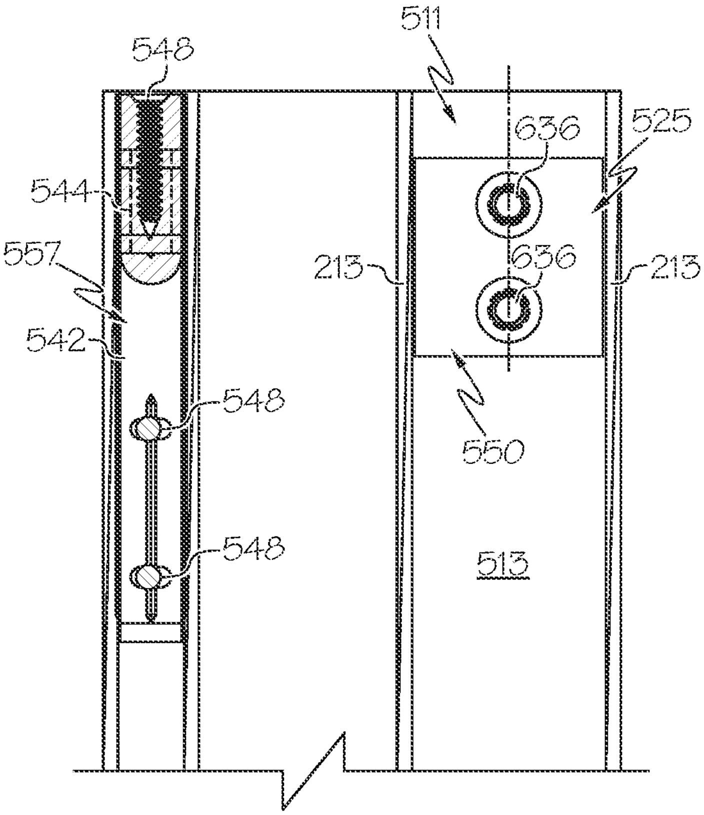

Turning to FIGS. 6-8, the same components of corner joint assembly 500 as illustrated in FIG. 5 are similarly numbered in FIGS. 6-8. Spigot and nut plate assembly 550 may include a first bracket (i.e., a spigot component 610), which is further described below with reference to FIG. 9, and a second bracket (i.e., a nut plate 620).

The shape of the nut plate 620 may correspond to the interior surface of side wall 513. Nut plate 620 may be flat and sheet-like, with a rectangular outer edge. The nut plate 620 may comprise a small rectangular piece of sheet metal, such as galvanized steel, stainless steel, or aluminum, with holes drilled therein to accommodate bolts 636. As shown in FIG. 6, the nut plate 620 may be flat to lie against the interior surface of the extrusion 514, and the nut plate 620 may be sized to span between the opposing sidewalls 213 of the extrusion 514. As such, the nut plate 620 may provide robust support while also leaving the hollow end 511 open, for example, to receive the cartridge 231 of the shootbolt system 230 (FIG. 4).

For assembly, nut plate 620 may be inserted into the hollow region within the end 511 of the interior stile extrusion 514 and its holes may be aligned with a pair of holes drilled in the side wall 513 of the interior stile extrusion 514. Bolts 636 may then be inserted through the holes in nut plate 620 and the holes in the interior stile extrusion 514, and then through holes 906 (FIG. 9) in a base portion 902 (FIG. 9) of spigot 610. Nuts 638 may be attached to bolts 636 and tightened to secure the spigot 610 and nut plate 620 to interior stile extrusion 514. In this position, the sidewall 213 may be sandwiched and compressed the nut plate 620 and the spigot 610. Also, in this position, the spigot 610 may project out from the sidewall 213 of the interior stile extrusion 514. The bolts 636 may include serrated heads and/or hex-socket heads to facilitate tightening. The nuts 638 may optionally be lock nuts.

After attachment of the spigot and nut plate assembly 550 to interior stile extrusion 514, the interior rail extrusion 524 may be attached by slidably inserting the spigot 610 into the end 521 of interior rail extrusion 524, then fastening the interior rail extrusion to the flanges/arms 912, 914 (FIG. 9) of spigot 610 with screws 650 (FIGS. 6 & 7) that pass through the side wall 523.

Figure 9:
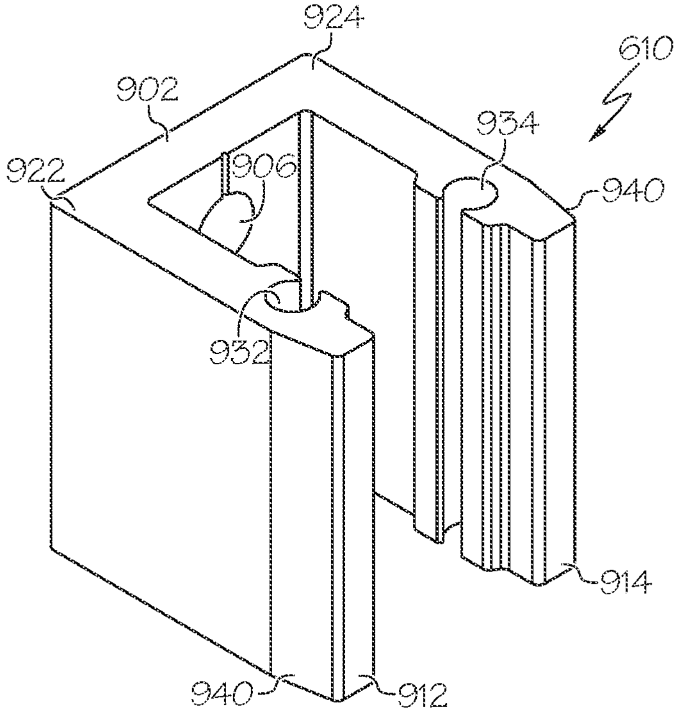
FIG. 9 is an isometric view of the spigot component of the spigot and nut plate assembly of FIGS. 6-8.

FIG. 9 is an enlarged isometric view of spigot 610. With reference to FIG. 9, spigot 610 may include a web (or base) 902 in which a pair of holes 906 is formed, e.g. by drilling through base 902. First and second flanges (or arms) 912, 914 are cantilevered and extend perpendicularly from lateral margins 922, 924 of base 902. Screw bosses or channels 932, 934 are formed in the respective flanges 912, 914 near distal ends thereof and extend parallel to web 902. The ends of flanges 912, 914 may be tapered to include lead-ins or chamfers 940. The chamfers 940 may be tapered with respect to the longitudinal axis of the rail extrusion 524, to facilitate insertion of spigot 610 into the interior rail extrusion 524. Once inserted, the screws 650 may extend through the side wall 523 of the rail extrusion 524 to be received in the channels 932, 934 to fixedly attach the rail extrusion 524 to the spigot 610 and, thus, to the stile extrusion 514.

Web 902 and flanges 912, 914 may be formed together in a unitary one-piece construction. In some embodiments, spigot 610 (including web 902, flanges 912, 914, screw bosses 932, 934 and lead-ins 940) may be extruded from aluminum or another metal, or from a high-strength polymer material such as fiberglass reinforced polyurethane composite or ROVEX® (sold by Deceuninck North America, LLC). Bar stock of such extruded material may be cut to lengths and finished by drilling holes 906. In other embodiments spigot may be formed by injection molding. Alternatively, spigot 610 may be formed by machining or another method, and may alternatively be shaped as a block (not illustrated) instead of a web and flanges.

As mentioned, the corner joint assembly 500 may be used at multiple corners of the panel frame assembly of one or more of the panels 110. Assembly may be facilitated and, yet the corner joint assembly 500 may provide robust support. Additionally, the corner joint assembly 500 may be used in corners that include the shootbolt cartridge 231 as well as ones that do not.

Figure 10:
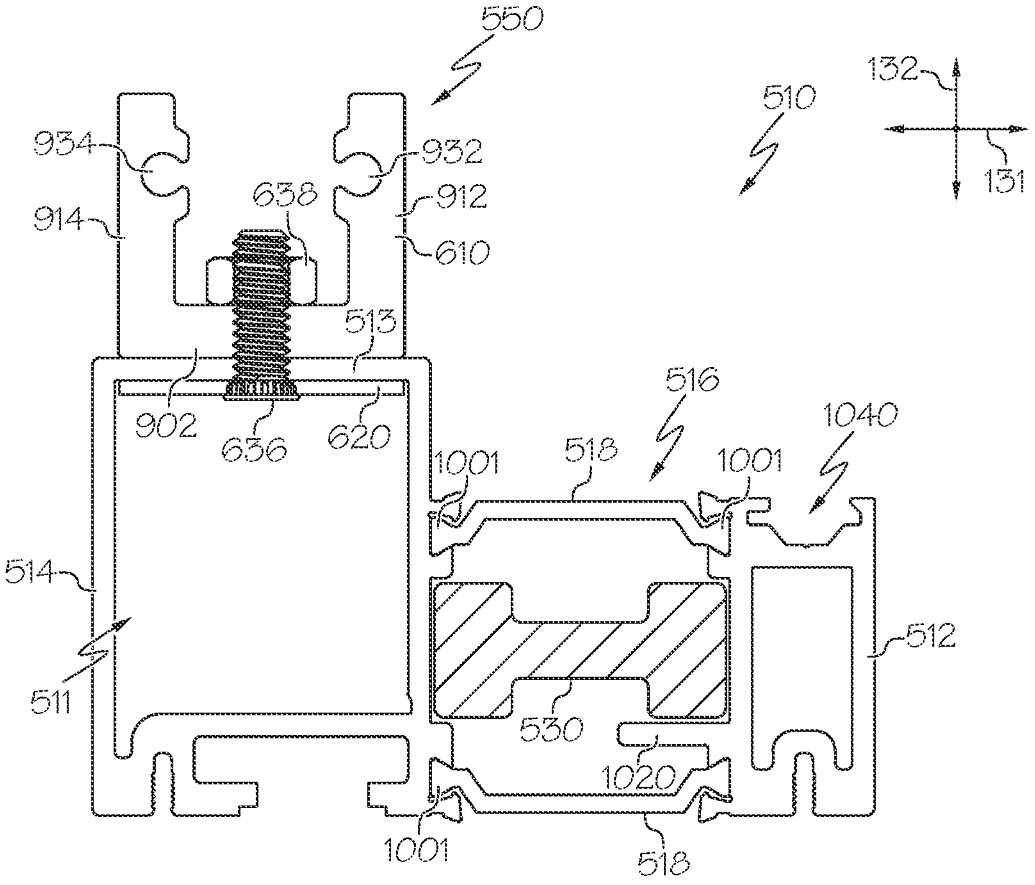
FIG. 10 is an end view of a stile assembly of the panel frame of the folding patio door system of FIG. 2, showing details of a thermal break section including a pair of thermal struts joining interior and exterior aluminum stile extrusions and an optional structural reinforcement insert.
Figure 11:
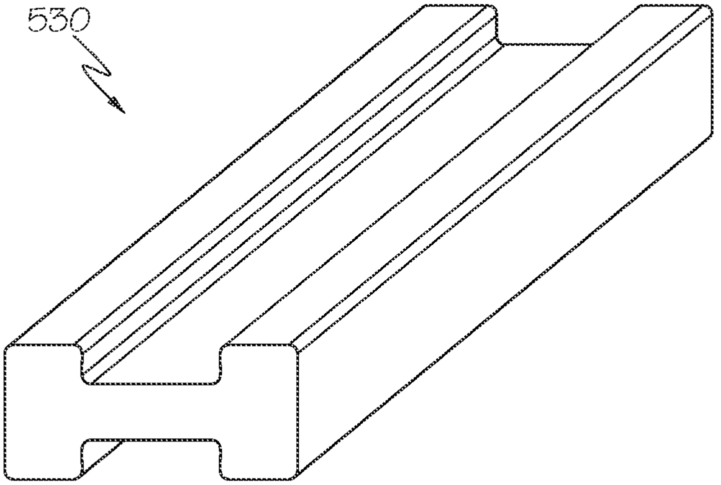
FIG. 11 is an isometric view of the optional structural reinforcement insert of the stile assembly of FIG. 10.

FIG. 10 is an enlarged end view of a stile 510 with an attached spigot and nut plate assembly 550. With reference to FIG. 10, thermal break 516 of stile 510 includes first and second thermal struts 518, which are spaced apart and have dovetail ends 1001 that are slidably inserted into dovetail grooves formed in the exterior and interior stile extrusions 512, 514, and then secured in place, for example by crimping the sidewalls of the dovetail grooves. Thermal struts 518 may be extruded of a high-strength reinforced polymer material, such as fiberglass reinforced polyamide, polyurethane composite, or ROVEX®. Thermal struts 518 have relatively low thermal conductivity, thermally isolating the exterior stile extrusion 512 from the interior stile extrusion 514 and thereby reducing thermal losses through the frame. Because thermal struts 518 are relatively thin, they generally have less strength than aluminum extrusions 512, 514, and can collapse under high loads or otherwise weaken the stile assembly. To improve overall strength of the frame, stile 510 may optionally include a structural reinforcement insert 530 having low thermal conductivity. Similarly, a rail 520 of the frame may also include a similar structural reinforcement insert 530. A preferred structural reinforcement insert 530 is shown in greater detail in FIG. 11. With reference to FIG. 11, structural reinforcement insert 530 may be made of a glass-reinforced polymer material, such as extruded ROVEX® resin-impregnated aligned fiberglass material sold by Deceuninck North America, LLC. The insert 530 may have slightly smaller width than the struts 518 (measured in the interior/exterior direction 131), but the insert 530 may be significantly thicker (as measured in the lateral direction 132) to provide high bending strength. The insert 530 may be extruded in an I-beam shape (with web and opposing flanges) or in another structural shape providing excellent bending strength to resist wind loading of the frame and to enhance the impact strength of the panel 110. Structural reinforcement insert 530 may be inserted into the space between thermal struts 518 and between the exterior and interior stile extrusions 512, 514. A rib 1020 projecting from an inner side of exterior frame extrusion 512 may support and center structural reinforcement insert 530, and may prevent it from shifting during flexing of the stile 510 under loads.

Panels 110 made according to the present disclosure, utilizing structural reinforcement inserts 530 in the stiles 510 (and optionally also in the rails 520), may provide a very strong construction in a relatively narrow frame having very good sight lines. In one example, stiles and rails 510, 520 have a width dimension (indicated at 560 in FIGS. 4 and 5) that is approximately 2.0 inches (51 mm) or less, and a depth (indicated at 562 in FIGS. 4 and 5) of approximately 3.5 inches (89 mm) or less, while also being capable of carrying glazing panels weighing up to 300 lbs. (136 kg), or more, and providing excellent rigidity and resistance to structural deflection, meeting industry standards for performance grade of PG35, PG50, or better, and impact certification, all per American Architectural Manufacturers Association standard AAMA 506-16.

Also illustrated in FIG. 10 is a glazing channel 1040 formed in exterior stile extrusion 512, which receives a glazing stop 190 (FIGS. 2 & 3) for retaining the glazing panel 124 in the frame. Glazing stops 190 may come in different shapes and sizes to accommodate glazing panels 124 of different thicknesses, such as either double- or triple-glazed IGUs.

Figure 13:
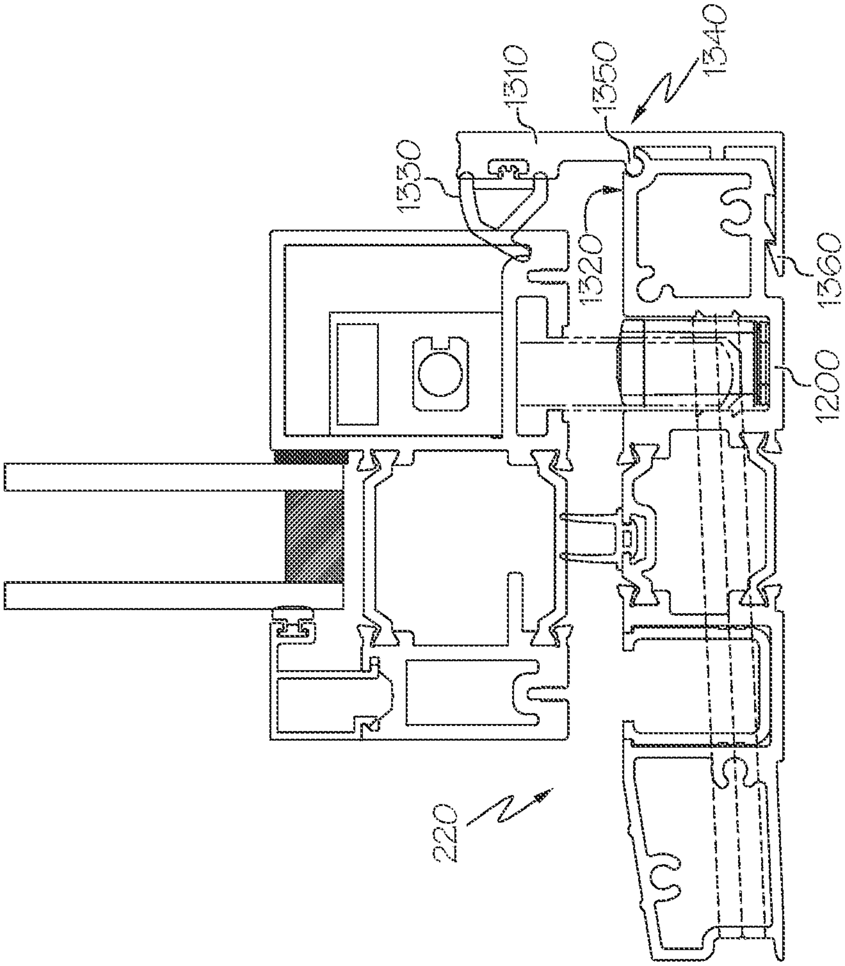
Figure 14:
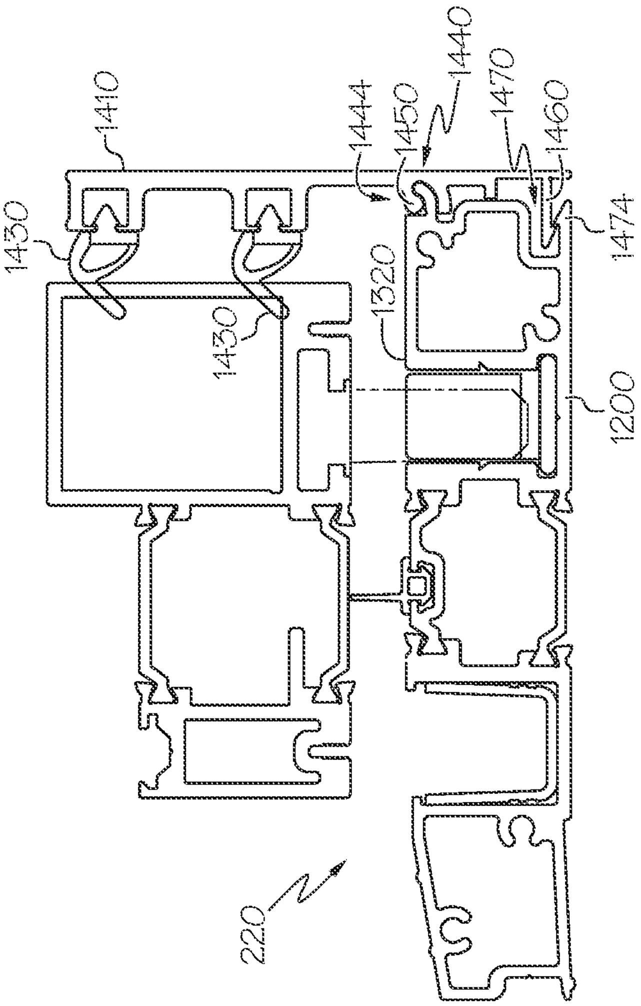

FIGS. 12-14 illustrate three different configurations of a sill 220 of the folding patio door system 100 according to another aspect of the present disclosure. FIG. 12 illustrates a sill assembly in a "flush" configuration providing the lowest possible profile. FIG. 13 illustrates a standard configuration including a standard upstand 1310 attached to a base member 1200 of sill 220. FIG. 14 illustrates an extended upstand configuration including a tall upstand 1410 attached to base member 1200 of sill in substitution for standard upstand. Note that a glazing panel and glazing bead of the sill 220 (shown in FIGS. 12 and 13) are not illustrated in FIG. 14, but would normally be included. The flush configuration of FIG. 12 is suitable for indoor use or in temperate or tropical climates that do not experience high wind or hurricane conditions. The standard upstand 1310 of the standard configuration of FIG. 13 stands above the top surface 1320 of the threshold portion of sill 220, for example, by approximately 1.125 inch (27.8 mm) and may include a single resilient weatherstrip 1330 against which the bottom rail of the panels 110 seat and compress the weatherstrip 1330 when the panels 110 are closed to thereby provide a good environmental seal having good thermal performance.

Upstand 1310 may be attached to base member 1200 via respective mounting features, such as a knuckle-joint 1340. The knuckle-joint may be assembled by inserting a bulb 1350 of upstand 1310 into a mating knuckle groove of the base member 1200 while the upstand is inclined approximately 30-45 degrees outwardly, then rotating the upstand 1310 to the upright position where a barbed end 1360 of a cantilever foot portion of the upstand snaps around a ridge on a bottom surface of the base member 1200. The barbed end 1360 may be captured under the base member 1200 when the sill 220 is installed onto a subfloor or other floor support, preventing the knuckle joint 1340 from coming apart. A similar knuckle joint 1220 may be utilized in the flush configuration of FIG. 12, but in a trim piece 1230 that is provided merely to fill the knuckle groove for aesthetic reasons and to prevent the knuckle groove from collecting debris.

Alternative mounting features, such as a knuckle joint and upstand attachment mechanism is illustrated in the extended/tall upstand configuration of FIG. 14. It will be understood that in other embodiments (not illustrated) the knuckle joint and upstand attachment mechanism of FIG. 13 could be substituted.

The tall upstand 1410 of the extended upstand configuration of FIG. 14 may stand above the top surface 1320 of sill 220 by approximately 2.25 inches (57.2 mm) and may include one, two, or more resilient weatherstrips 1430 (two are illustrated) against which the frame members of the panels 110 seat when closed. The extended upstand configuration of FIG. 14 may be suitable for use in hurricane zones and other environments that experience wind-driven rain, and may be designed to exceed DP-35 or DP-50 or DP-70 performance, tested in accordance with ASTM E547-00 (2016) for water penetration, or to exceed performance grade PG35, PG50, or PG70, tested for water penetration in accordance with AAMA standard 506-16.

The base member 1200 and the tall upstand 1410 may have alternative mounting features. The tall upstand 1410 may be attached to base member 1200 via a knuckle joint 1440 and latching barb 1460. The knuckle joint 1440 and latching barb 1460 may be somewhat different from the knuckle joint 1340 and barbed end 1360 of the standard configuration of FIG. 13. In particular, a receiving groove of knuckle joint 1440 may have a slot 1444 that is approximately the same width as or wider than a bulb 1450 of knuckle joint 1440 and may be open on top (lacking an overhanging portion) so the knuckle joint 1440 may be more easily assembled and released. Also, the latching barb 1460 of upstand 1410 may face downward and may be inserted into a slot 1470 in base member 1200 where it may engage an upwardly-facing barb 1474 within the slot 1470. The attachment design illustrated in FIG. 14 allows upstand 1410 to be installed after base 1200 is installed in a building, and facilitates replacement of upstand 1410 when needed, without removing or lifting base 1200 from the floor or subfloor on which it is supported. Of course the same upstand attachment mechanism as illustrated in FIG. 14 could also be utilized with the flush and standard sill configurations of FIGS. 12 and 13.

FIG. 15 illustrates a header assembly 1500 of the folding patio door system of FIG. 2 showing panel 110 suspended therefrom. With reference to FIG. 15, header assembly 1500 includes a header rail assembly 1510 including an interior header rail extrusion 1512 and an exterior header rail extrusion 1514 connected by a thermal break 1516 made up of a pair of thermal struts 1518. Exterior header rail extrusion 1514 includes a track 1520 extending along the length of header rail assembly 1510. A hangar assembly 142 of panel 110 engages track 1520 and suspends panel 110 from header rail assembly 1510. Hanger assembly 142 may be a fixed hanger with a fixed attachment (as illustrated) or a traveling hanger that includes one or more rollers 146 (FIG. 3) that are received in and guided by track 1520. Hangar assembly 142 may also include a hinge (e.g. hinge 172 of FIG. 3). Exterior header rail extrusion 1514 may include a slot 1530 or pocket for receiving the shootbolt 260 of the shootbolt mechanism 232 carried by panel 110, to secure panel 110 in the closed position.

It will be obvious to those having skill in the art that many changes may be made to the details of the above-described embodiments without departing from the underlying principles of the present disclosure. The scope of the present disclosure should, therefore, be determined only by the claims.

What is claimed is:

1. A fenestration unit configured to support a shootbolt locking system, the fenestration unit comprising:

a panel including a panel frame that supports a glazing unit with a peripheral edge, the panel having an interior side and an exterior side, the panel frame including a stile and a rail that partly cover the peripheral edge and that meet to define a panel corner;

the stile having a first stile member at the interior side and a second stile member at the exterior side, the first stile member and the second stile member separated by a thermal break that spans across the peripheral edge of the glazing unit, the rail including a first rail member at the interior side and a second rail member at the exterior side, the first rail member and the second rail member separated by the thermal break;

the first stile member and the first rail member attached by a first corner joint of the panel corner, the first stile member and the first rail member being elongate and extending along a respective linear axis, the first stile member configured to receive and support at least part of the shootbolt locking system;

the first stile member including a stile end with a first wall, and the first rail member including a rail end with a second wall;

the first corner joint including a first bracket and a second bracket, the first bracket and the second bracket being attached together, the first bracket disposed within the stile end, the first wall disposed between the first and second brackets, the second bracket projecting away from the first stile member, and the second bracket received within the rail end and attached to the second wall; and the second stile member and the second rail member attached by a corner key at a second corner joint of the panel corner, the second corner joint and the first corner joint separated by the thermal break, the corner key including a first leg and a second leg that project at a nonzero angle from each other, the first leg of the corner key being partly received in and attached to the second stile member, the second leg of the corner key being partly received in and attached to the second rail member.

2. The fenestration unit of claim 1, wherein the first stile member, including the stile end, is hollow and is defined by the first wall; and wherein the first bracket is shaped to correspond to an interior surface of the first wall to further define the hollow stile end.

3. The fenestration unit of claim 2, wherein the first bracket includes a flat plate.

4. The fenestration unit of claim 1, further comprising a shootbolt mechanism with a shootbolt that is supported within the stile end, the shootbolt supported for movement between a retracted position within the stile end and a projected position in which the shootbolt projects out of the stile end.

5. The fenestration unit of claim 4, wherein the panel is a first panel, further comprising a second panel that is foldably attached to the first panel;

wherein the second panel includes a third stile member and a third rail member that are attached by a third corner joint, the third stile member having a corresponding cross sectional profile to the first stile member, the third rail member having a corresponding cross sectional profile to the first rail member;

the third corner joint corresponding to the first corner joint to join the third stile member and the third rail member.

6. The fenestration unit of claim 4, further comprising an operator control that is manually moveable to selectively move the shootbolt between the retracted position and the projected position; and wherein the operator control is supported by the first stile member.

7. The fenestration unit of claim 6, wherein the panel defines an interior/exterior direction, a lateral direction, and a vertical direction; and wherein the operator control is supported by a face of the first stile member facing in the lateral direction.

8. The fenestration unit of claim 4, wherein the operator control is received and recessed within the first stile member.

9. The fenestration unit of claim 1, wherein the second bracket includes a tapered lead-in surface that is tapered with respect to the linear axis of the first rail member.

10. The fenestration unit of claim 1, wherein the thermal break further includes a thermal reinforcement member.

11. The fenestration unit of claim 1, wherein the second bracket includes a web as well as a first flange and a second flange that extend from the web;

wherein the first wall is disposed between the first bracket and the web; and wherein the first flange and the second flange are attached to the second wall.

12. The fenestration unit of claim 1, further comprising a door frame that supports the panel and an additional panel for folding and unfolding movement relative thereto.

13. The fenestration unit of claim 12, wherein the door frame comprises a selectively configurable sill assembly that includes:

a sill with a face and a first mounting feature on the face; and an upstand including a second mounting feature configured to removably attach to the first mounting feature.

14. The fenestration unit of claim 1, wherein the thermal break includes a strut that covers the peripheral edge of the glazing unit.

15. A method of manufacturing a panel frame of a panel of a fenestration unit having a glazing unit and a shootbolt locking system, the panel frame including a stile and a rail that partly cover a peripheral edge of the glazing unit and that meet to define a panel corner, the method comprising:

providing a first stile member of the stile and a first rail member of the rail, the first stile member and the first rail member being elongate and extending along a respective linear axis, the first stile member configured to receive and support at least part of the shootbolt locking system, the first stile member including a stile end with a first wall, and the first rail member including a rail end with a second wall;

attaching the first stile member and the first rail member with a first corner joint of the panel corner, including:

attaching a first bracket and a second bracket together with the first bracket disposed within the stile end, the first wall disposed between the first and second brackets, and the second bracket projecting away from the first stile member;

inserting the second bracket into the first rail end; and attaching the second wall to the second bracket;

attaching, with a corner key that includes a first leg and a second leg that project at a nonzero angle from each other, a second stile member of the stile and a second rail member of the rail at a second corner joint of the panel corner, including:

receiving the first leg of the corner key in the second stile member and attaching the first leg to the second stile member; and receiving the second leg of the corner key in the second rail member and attaching the second leg to the second rail member; and providing a thermal break, in an interior/exterior direction of the panel, between the first stile member and the second stile member and between the first rail member and the second rail member to separate the first corner joint and the second corner joint for spanning the thermal break across the peripheral edge of the glazing system.

16. The method of claim 15, wherein the first stile member and the first rail member are linear extrusions.

17. The method of claim 16, further comprising extruding the first stile member and the first rail member.

18. A folding door system comprising:

a panel including a panel frame that supports a glazing unit with a peripheral edge, the panel, the panel having an interior side and an exterior side, the panel frame including a stile and a rail that partly cover the peripheral edge and that meet to define a panel corner;

the stile having a first stile member at the interior side and a second stile member at the exterior side, the first stile member and the second stile member separated by a thermal break that spans across the peripheral edge of the glazing unit, the rail including a first rail member at the interior side and a second rail member at the exterior side, the first rail member and the second rail member separated by the thermal break;

the first stile member and the first rail member attached by a first corner joint of the panel corner, the first stile member and the first rail member being elongate and extending along a respective linear axis;

a shootbolt locking system with a shootbolt cartridge supported in the first stile member and an operator control supported in the first stile member;

the first stile member including a stile end with a first wall, and the rail member including a rail end with a second wall;

the first corner joint including a first bracket and a second bracket, the first bracket and the second bracket being attached together, the first bracket disposed within the stile end proximate the shootbolt cartridge, the first wall disposed between the first and second brackets, the second bracket projecting away from the first stile member, and the second bracket received within the rail end and attached to the second wall; and the second stile member and the second rail member attached by a corner key at a second corner joint of the panel corner, the second corner joint and the first corner joint separated by the thermal break, the first leg of the corner key being partly received in and attached to the second stile member, the second leg of the corner key being partly received in and attached to the second rail member.

19. The folding door system of claim 18, wherein the thermal break includes a strut that covers the peripheral edge of the glazing unit.

* * * * *